US012606151B2

(12) United States Patent
Wang et al.

(10) Patent No.: US 12,606,151 B2
(45) Date of Patent: Apr. 21, 2026

(54) VEHICLE CONTROL METHOD AND APPARATUS, ELECTRONIC APPARATUS, AND COMPUTER-READABLE STORAGE MEDIUM

(71) Applicant: Shenzhen Yinwang Intelligent Technologies Co., Ltd., Shenzhen (CN)

(72) Inventors: Kai Wang, Shenzhen (CN); Yongyou Zhou, Shanghai (CN); Kun Li, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 111 days.

(21) Appl. No.: 18/586,168

(22) Filed: Feb. 23, 2024

(65) Prior Publication Data

US 2024/0217505 A1 Jul. 4, 2024

Related U.S. Application Data

(63) Continuation of application No. PCT/CN2022/096543, filed on Jun. 1, 2022.

(30) Foreign Application Priority Data

Aug. 26, 2021 (CN) .......................... 202110987462.7

(51) Int. Cl.
B60W 10/20 (2006.01)
B60T 8/1755 (2006.01)

(52) U.S. Cl.
CPC ........... B60W 10/20 (2013.01); B60T 8/1755 (2013.01); B60W 2510/202 (2013.01)

(58) Field of Classification Search
CPC ........... B60W 10/20; B60W 2510/202; B60W 2520/14; B60W 2540/18; B60W 2720/30;
(Continued)

(56) References Cited

U.S. PATENT DOCUMENTS

2005/0236894 A1 10/2005 Lu et al.
2005/0236896 A1 10/2005 Offerle et al.
(Continued)

FOREIGN PATENT DOCUMENTS

CN 1966333 A 5/2007
CN 101074015 A 11/2007
(Continued)

*Primary Examiner* — Yi-Kai Wang
(74) *Attorney, Agent, or Firm* — Leydig, Voit & Mayer, Ltd.

(57) ABSTRACT

This application relates to the automobile field, and specifically, to a vehicle control method and apparatus, and the like. In the vehicle control method, when a steering mode of braking a rear wheel on an inner steering side is performed, target braking force of the rear wheel on the inner steering side is determined based on hand force applied when a driver performs a steering operation on a steering wheel, and steering control is performed based on the target braking force. In this way, steering control that well reflects an intention of the driver can be implemented, to avoid a case in which the driver frequently performs a driving operation to correct a traveling track of a vehicle, and reduce a driving burden. The method provided in embodiments of this application may be applied to an intelligent vehicle.

20 Claims, 11 Drawing Sheets

(58) Field of Classification Search
CPC ......... B60W 30/18145; B60W 10/184; B60W 30/045; B60T 8/1755; B60T 2270/303; B62D 7/159; B62D 11/24; B62D 11/003; B62D 11/08; Y02T 10/72
USPC .......................................................... 701/41
See application file for complete search history.

(56) References Cited

U.S. PATENT DOCUMENTS

| | | | |
|---|---|---|---|
| 2007/0176488 A1* | 8/2007 | Miyajima ............... | B62D 11/24 |
| | | | 303/146 |
| 2018/0237059 A1* | 8/2018 | Lian ..................... | B62D 11/003 |
| 2018/0237064 A1* | 8/2018 | Nasu ..................... | B62D 6/003 |
| 2020/0156607 A1* | 5/2020 | Ueno .................... | B60W 30/02 |
| 2021/0078582 A1* | 3/2021 | Murase ................. | B60W 10/08 |

FOREIGN PATENT DOCUMENTS

| | | | |
|---|---|---|---|
| CN | 108001293 A | 5/2018 |
| CN | 109501860 A | 3/2019 |
| CN | 110239551 A | 9/2019 |
| EP | 2583882 A1 | 4/2013 |
| JP | 2009056949 A | 3/2009 |
| JP | 2010179846 A | 8/2010 |

* cited by examiner

VEHICLE CONTROL METHOD AND APPARATUS, ELECTRONIC APPARATUS, AND COMPUTER-READABLE STORAGE MEDIUM

CROSS-REFERENCE TO RELATED APPLICATIONS

This application is a continuation of International Application No. PCT/CN2022/096543, filed on Jun. 1, 2022, which claims priority to Chinese Patent Application No. 202110987462.7, filed on Aug. 26, 2021. The disclosures of the aforementioned applications are hereby incorporated by reference in their entireties.

TECHNICAL FIELD

This application relates to the automobile field, and in particular, to a vehicle control method and apparatus, and the like.

BACKGROUND

A minimum steering radius of a vehicle is an important indicator to measure an ultimate steering capability of the vehicle. A smaller minimum steering radius indicates a higher ultimate steering capability of the vehicle. Currently, most vehicles are conventional front wheel steering vehicles. Due to a limitation of a mechanical structure and a design manner of a steering system, when a steering wheel is turned to a limit position, a maximum rotation angle that a front wheel can reach determines a minimum steering radius that the vehicle can reach. Consequently, a steering capability of the vehicle cannot break through a mechanical limitation of the conventional steering system and cannot be further improved.

To break through the limitation of the mechanical structure of the conventional steering system on the ultimate steering capability of the vehicle and further reduce the minimum steering radius of the vehicle, there is the following vehicle control method: During steering, for example, a wheel on an inner steering side is braked based on gear information, a running status of an engine, a vehicle velocity, and the like, so that the vehicle generates an additional yaw moment. In this way, steering is performed by manipulating the front wheel, and is performed by using the additional yaw moment. Therefore, the minimum steering radius of the vehicle can be reduced, and the steering capability of the vehicle can be improved. Herein, the inner steering side is a side in a direction the same as a steering direction. For example, when steering to the left is performed, a left side is the inner steering side, and a right side is an outer steering side.

SUMMARY

However, in the vehicle control method, because the steering radius is determined based on the gear information, the running status of the engine, and the vehicle velocity, an intention of a driver is not considered, that is, a degree of steering expected by the driver is not considered. Therefore, the intention of the driver cannot be well reflected, and there is still room for improvement in reducing a driving burden.

Embodiments of this application provide a steering control solution, including a vehicle control method, a vehicle control apparatus, a related electronic apparatus, a computer-readable storage medium, and the like, to better reduce a driving burden.

According to a first aspect of this application, a vehicle control method is provided, and includes: obtaining steering wheel torque existing when a driver performs a steering operation on a steering wheel; determining target torque of a first wheel based on the steering wheel torque; and performing first steering control, where the first steering control includes: controlling the first wheel based on the target torque.

Herein, the "target torque" of the first wheel is torque in a rotation direction of the wheel.

According to the vehicle control method, the target torque of the first rear wheel is determined based on the steering wheel torque of the driver, and the first wheel is controlled based on the target torque, so that steering with a small steering radius can be implemented. In addition, target braking force of a wheel on an inner steering side is determined based on an intention of the driver, to perform steering control, so that the steering control with a "small steering radius" can well reflect the intention of the driver, to reduce a driving burden. Specifically, hand force applied when the driver performs the steering operation reflects a requirement or an expectation of the driver for a steering radius. Therefore, the target torque of the first wheel is determined based on the steering wheel torque that represents the hand force of the driver, to perform steering control, so that steering control that well reflects the intention of the driver can be implemented, to avoid a case in which the driver frequently performs an operation in a steering process, for example, to correct a traveling track of a vehicle, and reduce a driving burden.

In addition, according to the vehicle control method, a minimum steering radius can be reduced without adding a hardware device or depending on a complex steering system, and the vehicle control method has advantages of low costs and a simple control policy.

Furthermore, the vehicle control method has good universality; and may be applied to a plurality of vehicles, including a distributed drive vehicle and a centralized drive vehicle.

In a possible implementation of the first aspect, the obtaining target torque of a first wheel based on the steering wheel torque includes: obtaining braking torque of a first inner-side rear wheel based on the steering wheel torque, where the first inner-side rear wheel is a rear wheel located on an inner steering side; and the controlling the first wheel based on the target torque includes: braking the first inner-side rear wheel based on the braking torque.

According to the vehicle control method, the braking torque of the rear wheel on the inner steering side is determined based on the steering wheel torque, and braking force is applied to the first inner-side rear wheel based on the braking torque during steering, to perform steering with a small steering radius. In this way, the braking torque of the wheel on the inner steering side is determined based on the intention of the driver, to perform steering control, so that the steering control with a "small steering radius" can well reflect the intention of the driver, to reduce a driving burden.

In another implementation, target driving force of a first outer-side rear wheel may be determined based on the steering wheel torque, where the first outer-side rear wheel is a rear wheel located on an outer steering side; and the first outer-side rear wheel may be driven based on the target driving force. In this case, braking force may be or may not be applied to the first inner-side rear wheel.

In addition, for example, when there is a four-wheel vehicle, there may be one first inner-side rear wheel and one first outer-side rear wheel. For example, when a quantity of wheels is greater than 4, there may be one or more wheels.

In a possible implementation of the first aspect, the obtaining braking torque of a first inner-side rear wheel based on the steering wheel torque includes: obtaining a first yaw moment based on the steering wheel torque: obtaining an actual yaw rate error: obtaining a second yaw moment based on the steering wheel torque and the actual yaw rate error; and obtaining the braking torque based on the first yaw moment and the second yaw moment.

Herein, the actual yaw rate error is a difference between a target yaw rate and an actual yaw rate. The first yaw moment may be typically an additional yaw moment for feedforward control, and the second yaw moment may be typically an additional yaw moment for feedback compensation.

In the manner, the second yaw moment is determined based on the steering wheel torque and the yaw rate error, and the braking torque is determined based on the first yaw moment and the second yaw moment. That is, steering control in this manner is closed-loop control, which can effectively resist external interference and improve precision of steering control.

In a possible implementation of the first aspect, the obtaining a second yaw moment based on the steering wheel torque and the actual yaw rate error includes: obtaining a target yaw rate error based on the steering wheel torque; and obtaining the second yaw moment based on the target yaw rate error and the actual yaw rate error.

In a possible implementation of the first aspect, the obtaining an actual yaw rate error includes: obtaining the actual yaw rate error based on a target yaw rate and an actual yaw rate.

In a possible implementation of the first aspect, when the steering wheel torque is less than a first threshold, the target yaw rate error is determined as ( )

In a possible implementation of the first aspect, when the steering wheel torque is greater than a first threshold, the target yaw rate error is obtained based on the steering wheel torque and a second function relationship.

In a possible implementation of the first aspect, when the steering wheel torque is greater than a second threshold, the target yaw rate error is determined as a constant value.

In a possible implementation of the first aspect, when the steering wheel torque is less than a first threshold, the first yaw moment is determined as 0. Alternatively, the target torque may be determined as 0).

In this way, steering control for applying braking force to the rear wheel on the inner steering side can be avoided when the hand force of the driver is very low; and steering control that better reflects the intention of the driver can be implemented.

In a possible implementation of the first aspect, when the steering wheel torque is greater than a first threshold, the first yaw moment is obtained based on the steering wheel torque and a first function relationship. The first function relationship may be a linear function relationship or a non-linear function relationship. Higher steering wheel torque indicates a higher first yaw moment. Alternatively, when the steering wheel torque is greater than a first threshold, the first yaw moment may be obtained based on the steering wheel torque.

In this way, the intention of the driver can be well reflected during steering.

In a possible implementation of the first aspect, when the steering wheel torque is greater than a second threshold, the first yaw moment is determined as a constant value.

Alternatively, the target torque may be determined as a constant value.

In this way, traveling instability of the vehicle that is caused due to excessively high braking force can be avoided.

In a possible implementation of the first aspect, the method further includes: obtaining on/off state information of a first enabling switch; and performing the first steering control when the on/off state information indicates that the first enabling switch is turned on.

It may be understood that the first enabling switch herein is used to indicate whether the first steering control (mode) is allowed to be enabled. The first enabling switch may be a physical switch disposed on the vehicle (for example, a dashboard), or may be a virtual switch displayed in a man-machine interaction interface.

In the manner, steering control that better reflects the intention of the driver can be implemented. That is, when the first enabling switch is turned on, it indicates that the driver intends to start a steering mode of applying the braking force to the inner-side rear wheel. Therefore, when the first enabling switch is turned on, the first steering control is performed, so that the steering control can better reflect the intention of the driver.

In a possible implementation of the first aspect, the method further includes:

obtaining on/off state information of a first enabling switch: obtaining a road adhesion coefficient; and performing the first steering control when the on/off state information indicates that the first enabling switch is turned off and the road adhesion coefficient is less than an adhesion coefficient threshold.

In the manner, even if the first enabling switch is not turned on, the first steering control is performed when the road adhesion coefficient is less than the adhesion coefficient threshold. In this way, a steering capability of the vehicle can be improved as much as possible while stability of the vehicle is ensured.

In a possible implementation of the first aspect, the method further includes: obtaining a rotation angle of the steering wheel; and performing the first steering control when the rotation angle is a limit rotation angle.

In the manner, when the rotation angle of the steering wheel is the limit rotation angle (that is, the driver operates the steering wheel to the left or to the right to a limit position), steering control for braking the rear wheel on the inner steering side is performed. Therefore, a capability of a steering system to steer the wheel by operating the steering wheel can be fully used, interference to normal steering of the vehicle can be reduced, and the first steering control is avoided when no braking force needs to be applied to the inner-side rear wheel.

In a possible implementation of the first aspect, the method further includes: obtaining a slip ratio of the first inner-side rear wheel; and obtaining target driving force of a first outer-side rear wheel based on the steering wheel torque when the slip ratio is greater than a first slip ratio threshold, where the first outer-side rear wheel is a rear wheel located on an outer steering side, where the first steering control further includes: driving the first outer-side rear wheel based on the target driving force.

In a possible implementation of the first aspect, the method further includes: obtaining a slip ratio of the first inner-side rear wheel; and obtaining target driving force of a first outer-side front wheel based on the steering wheel torque when the slip ratio is greater than a first slip ratio threshold, where the first outer-side front wheel is a front wheel located on an outer steering side, where the first steering control further includes: driving the first outer-side front wheel based on the target driving force.

In the manner, a steering capability of the vehicle can be further improved by increasing the driving force of the first outer-side rear wheel or the first outer-side front wheel, to reduce occurrence of a case in which a steering requirement of the driver cannot be met after the slip ratio of the wheel reaches a maximum slip ratio. That is, for example, in consideration of stability of the vehicle and the like, the braking force of the inner-side rear wheel cannot be infinitely increased. Therefore, there is a limit to improving the steering capability of the vehicle by applying the braking force to the inner-side rear wheel. Therefore, there may be a case in which the steering requirement of the driver cannot be met. In the manner of increasing braking force of the outer-side rear wheel, the steering capability of the vehicle can be further improved, to reduce occurrence of this case.

According to a second aspect of this application, a vehicle control apparatus is provided, and includes a processing module and an obtaining module. The obtaining module is configured to obtain steering wheel torque existing when a driver performs a steering operation on a steering wheel. The processing module is configured to: determine target torque of a first rear wheel based on the steering wheel torque; and perform first steering control. The first steering control includes: performing braking control on the first wheel based on the target torque.

In a possible implementation of the second aspect, the processing module is configured to: obtain braking torque of a first inner-side rear wheel based on the steering wheel torque, where the first inner-side rear wheel is a rear wheel located on an inner steering side; and brake the first inner-side rear wheel based on the braking torque.

In a possible implementation of the second aspect, the processing module is configured to: obtain a first yaw moment based on the steering wheel torque: obtain an actual yaw rate error: obtain a second yaw moment based on the steering wheel torque and the actual yaw rate error; and obtain the braking torque based on the first yaw moment and the second yaw moment.

In a possible implementation of the second aspect, the processing module is configured to: obtain a target yaw rate error based on the steering wheel torque; and obtain the second yaw moment based on the target yaw rate error and the actual yaw rate error.

In a possible implementation of the second aspect, the processing module is configured to obtain the actual yaw rate error based on a target yaw rate and an actual yaw rate.

In a possible implementation of the second aspect, the processing module is configured to determine the braking torque as 0) when the steering wheel torque is less than a first threshold.

In a possible implementation of the second aspect, the processing module is configured to obtain the first yaw moment based on the steering wheel torque and a first function relationship when the steering wheel torque is greater than a first threshold.

In a possible implementation of the second aspect, the processing module is configured to determine the first yaw moment as a constant value when the steering wheel torque is greater than a second threshold.

In a possible implementation of the second aspect, the obtaining module is further configured to obtain on/off state information of a first enabling switch; and the processing module is configured to perform the first steering control when the on/off state information indicates that the first enabling switch is turned on.

In a possible implementation of the second aspect, the obtaining module is further configured to obtain on/off state information of a first enabling switch and a road adhesion coefficient; and the processing module is configured to perform the first steering control when the on/off state information indicates that the first enabling switch is turned off and the road adhesion coefficient is less than an adhesion coefficient threshold.

In a possible implementation of the second aspect, the obtaining module is further configured to obtain a rotation angle of the steering wheel; and the processing module is configured to perform the first steering control when the rotation angle is a limit rotation angle.

In a possible implementation of the second aspect, the processing module is further configured to: obtain a slip ratio of the first inner-side rear wheel; and obtain target driving force of a first outer-side rear wheel based on the steering wheel torque when the slip ratio is greater than a first slip ratio threshold, where the first outer-side rear wheel is a rear wheel located on an outer steering side, where the first steering control further includes: driving the first outer-side rear wheel based on the target driving force.

In a possible implementation of the second aspect, the processing module is further configured to: obtain a slip ratio of the first inner-side rear wheel; and obtain target driving force of a first outer-side front wheel based on the steering wheel torque when the slip ratio is greater than a first slip ratio threshold, where the first outer-side front wheel is a front wheel located on an outer steering side, where the first steering control further includes: driving the first outer-side front wheel based on the target driving force.

According to a third aspect of this application, an electronic apparatus is provided, and includes a processor and a memory. The memory stores computer program instructions, and when the computer program instructions are executed by the processor, the processor is enabled to perform the method in any solution described in the first aspect.

According to a fourth aspect of this application, a computer-readable storage medium is provided. The computer-readable storage medium stores computer program instructions, and when the computer program instructions are executed by a computer, the computer is enabled to perform the method in any solution described in the first aspect.

According to a fifth aspect of this application, a computer program product is provided. The computer program product includes computer program instructions, and when the computer program instructions are executed by a computer, the computer is enabled to perform the method in any solution described in the first aspect.

In the second aspect to the fifth aspect, technical effects the same as those of the vehicle control method in the first aspect can be achieved. No repeated descriptions are provided herein.

According to a sixth aspect of this application, a vehicle is provided. The vehicle includes the vehicle control apparatus, the electronic apparatus, or the computer-readable storage medium provided in the foregoing aspects.

This specification further provides the following steering control solution; obtaining steering wheel torque existing when a driver performs a steering operation on a steering wheel; determining a target yaw moment based on the steering wheel torque; determining, based on the target yaw moment, target torque to be applied to a wheel; and performing first steering control, where the first steering control includes: controlling rotation of the wheel based on the determined target torque.

DESCRIPTION OF EMBODIMENTS

To reduce a minimum steering radius of a vehicle, there is a vehicle control method:

During steering, a wheel on an inner steering side is braked based on gear information, a running status of an engine, a vehicle velocity, and the like, so that the vehicle generates an additional yaw moment. In this way, not only steering is performed by manipulating a front wheel, but also steering is performed by using the additional yaw moment. Therefore, the minimum steering radius of the vehicle can be reduced, and a steering capability of the vehicle can be improved. Herein, the inner steering side is a side in a direction the same as a steering direction. For example, when steering to the left is performed, a left side is the inner steering side, and a right side is an outer steering side.

However, in the vehicle control method, because whether the wheel on the inner steering side is braked is determined based on the gear information, the running status of the engine, and the vehicle velocity, an intention of a driver is not considered, that is, a degree of steering expected by the driver is not considered. Therefore, the intention of the driver cannot be well reflected, and there is still room for improvement in reducing a driving burden. For example, when the driver parks the vehicle, if the vehicle cannot well perform steering control based on the intention of the driver, a track of the vehicle may deviate from the intention of the driver. In this case, the driver needs to frequently perform an operation to enable the vehicle to travel to a correct parking position or enable the vehicle to travel based on an expected track to avoid collision with an obstacle.

Embodiments of this application provide a steering control solution, including a vehicle control method, a vehicle control apparatus, a related electronic apparatus, a computer-readable storage medium, and the like, to better reduce a driving burden.

A related structure of a vehicle to which the steering control solution is applied is first described.

Figure 1:
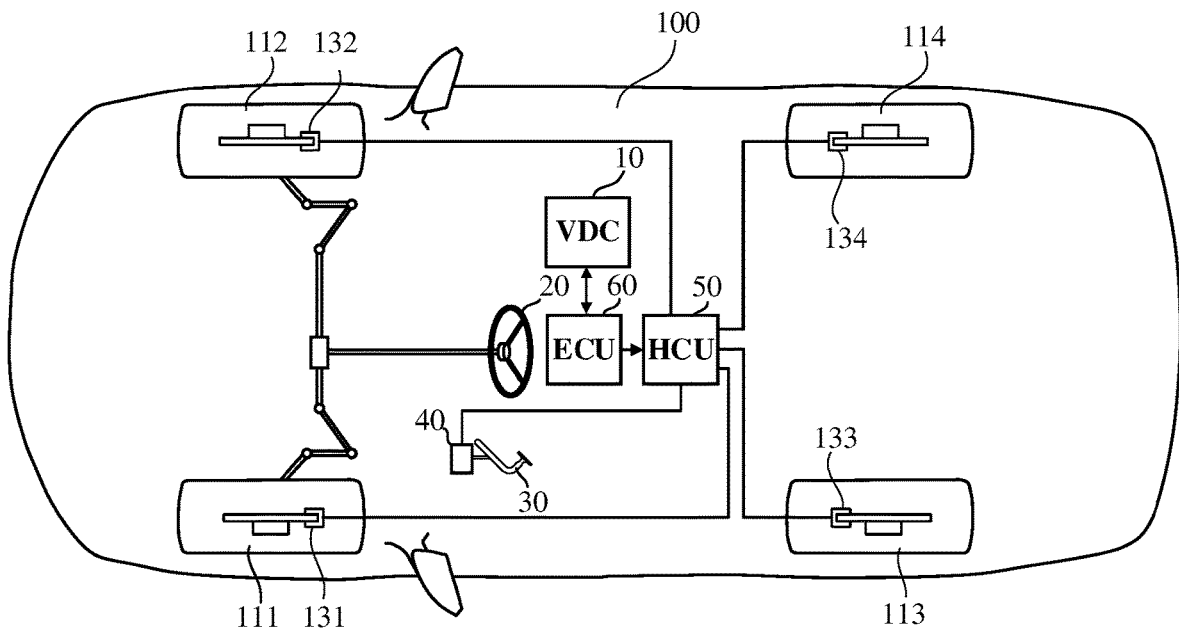
FIG. 1 is a schematic diagram of a structure of a vehicle to which a steering control solution is applied according to an embodiment of this application.

FIG. 1 is a schematic diagram of a structure of a vehicle to which a steering control solution is applied according to an embodiment of this application. As shown in FIG. 1, the vehicle 100 includes a steering wheel 20 and four wheels 111, 112, 113, and 114. The wheel 111 is a left front wheel, the wheel 112 is a right front wheel, the wheel 113 is a left rear wheel, and the wheel 114 is a right rear wheel. By operating the steering wheel 20, a driver can steer the two wheels 111 and 112 used as front wheels, so that the vehicle 100 can steer (including turning, changing a lane, and the like). Herein, a front direction, a rear direction, a left direction, and a right direction are defined by using the driver taking the vehicle 100 as a reference. That is, a direction facing the driver is used as the front direction, an opposite direction is used as the rear direction, a left direction for the driver is used as the left direction, and a right direction for the driver is used as the right direction.

In addition, the vehicle 100 further includes a vehicle domain controller (VDC) 10 and a brake system. The vehicle domain controller 10 may include an electronic control unit (ECU), and is configured to provide services to vehicle parts in a vehicle body domain and vehicle parts in a chassis domain. The vehicle parts in the vehicle body domain include, for example, a door/window lifting controller, an electric rearview mirror, an air conditioner, and a central door lock. The vehicle parts in the chassis domain include, for example, a vehicle part in the brake system, a vehicle part in a steering system, and a vehicle part, for example, a throttle, in an acceleration system.

The brake system mainly includes a brake pedal 30, a brake master cylinder 40, a hydraulic adjustment apparatus 50, a brake control apparatus 60, and four brake wheel cylinders 131, 132, 133, and 134. The brake pedal 30 is configured to receive an operation performed by the driver. The brake master cylinder 40 is configured to generate hydraulic pressure based on the operation performed by the driver. The hydraulic adjustment apparatus 50 is configured to: adjust the hydraulic pressure of the brake master cylinder 40, and control hydraulic pressure transferred to the brake wheel cylinders 131, 132, 133, and 134. The four brake wheel cylinders 131, 132, 133, and 134 are respectively disposed at the wheels 111, 112, 113, and 114, to brake the wheels 111, 112, 113, and 114. The brake control apparatus 60) includes, for example, an ECU, and is configured to: receive a control instruction from the vehicle domain controller 10, and control a working status of the hydraulic adjustment apparatus 50). Under control of the vehicle domain controller 10, the four brake wheel cylinders 131, 132, 133, and 134 may work independently. For example, different braking force may be applied to two coaxial wheels (including a case in which one of the two coaxial wheels is braked and the other is not braked), so that the vehicle 100 generates a yaw moment, to help the vehicle steer.

Specifically, for example, it is assumed that the driver operates the steering wheel 20) to the left to steer the vehicle 100 to the left. In this case, the vehicle domain controller 10 may enable the brake system to work, and apply braking force to the wheel 113 used as a rear wheel on an inner steering side. In this way, a steering radius of the vehicle 100 can be reduced, and a steering capability of the vehicle 100 can be improved.

Figure 2:
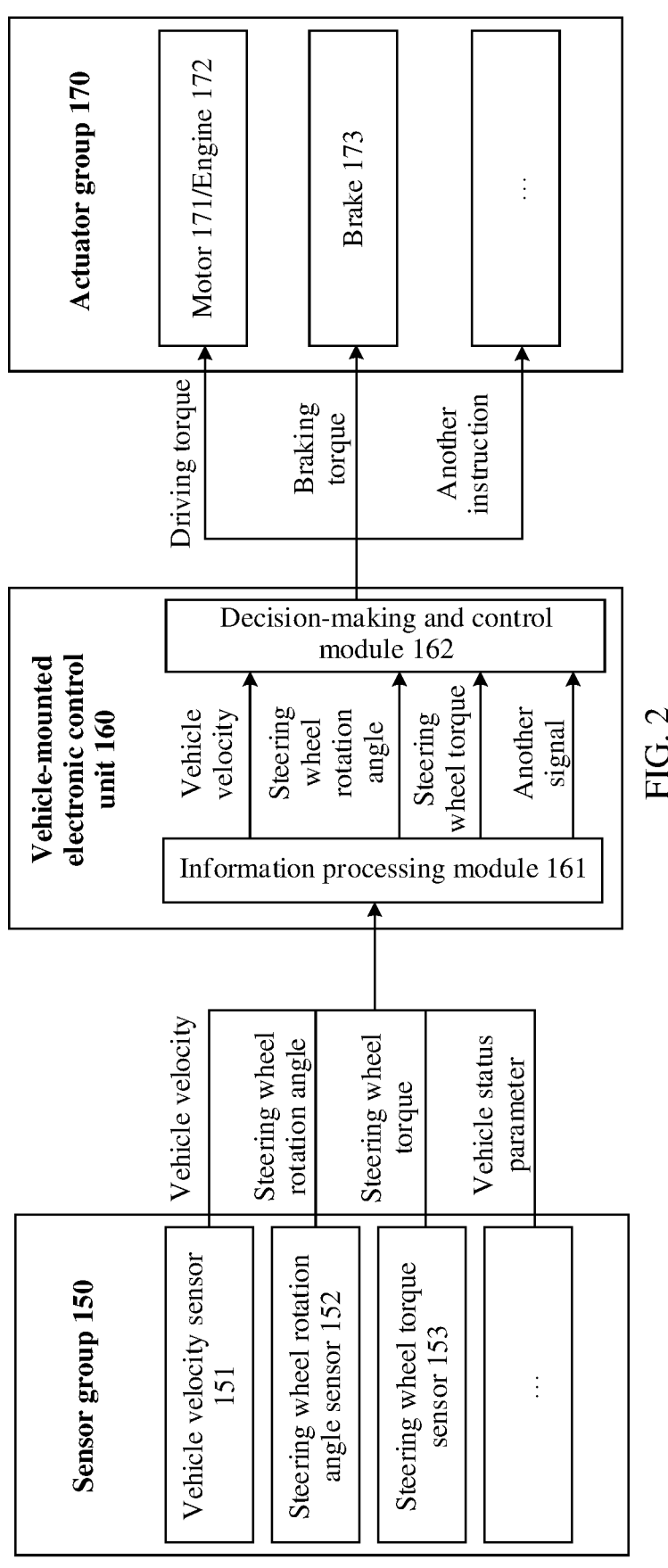
FIG. 2 is a schematic illustration of a system architecture of a vehicle to which a steering control solution is applied according to an embodiment of this application.

FIG. 2 is a schematic illustration of a system architecture of a vehicle to which a steering control solution is applied according to an embodiment of this application. As shown in FIG. 2, the vehicle includes a vehicle-mounted electronic control unit 160, a sensor group 150, and an actuator group 170. The vehicle-mounted electronic control unit 160 is, for example, a vehicle domain controller, and includes an information processing module 161 and a decision-making and control module 162. The sensor group 150 includes a vehicle velocity sensor 151, a steering wheel rotation angle sensor 152, and a steering wheel torque sensor 153. The vehicle velocity sensor 151 is configured to detect a vehicle velocity. The steering wheel rotation angle sensor 152 is configured to detect a steering wheel rotation angle. The steering wheel torque sensor 153 is configured to detect steering wheel torque.

In addition to the vehicle velocity sensor 151, the steering wheel rotation angle sensor 152, and the steering wheel torque sensor 153, the vehicle further includes other vehicle status sensors, for example, an inertial measurement unit (IMU) and a wheel velocity sensor. The inertial measurement unit is an apparatus for measuring attitude angles (or angular velocities) and acceleration of an object on three axes. Generally, the inertial measurement unit includes three uniaxial accelerometers and three uniaxial gyroscopes. The accelerometer detects acceleration signals of the object on three independent axes of a carrier coordinate system. The gyroscope detects an angular velocity and acceleration of the object in three-dimensional space. The inertial measurement unit is configured to obtain a course angle, a roll angle, longitudinal acceleration, lateral acceleration, vertical acceleration, and the like.

The information processing module 161 receives signals from these sensors, and performs corresponding processing. The decision-making and control module 162 performs corresponding control, including steering control described below, based on information obtained after processing by the information processing module 161.

The actuator group 170 includes a motor 171 (or an engine 172), a brake 173, and the like. The motor 171 (or the engine 172) is configured to drive the vehicle. The brake 173 includes a brake master cylinder and a brake wheel cylinder described above, and the like, and is configured to brake a wheel. These actuators receive a control instruction from the vehicle-mounted electronic control unit 160, and perform a corresponding action.

In the vehicle of the foregoing architecture, the sensor in the sensor group 150) transfers the vehicle velocity, a yaw rate, the steering wheel rotation angle, hand force (namely, the steering wheel torque) of a driver, and other vehicle status information to the vehicle-mounted electronic control unit 160, after processing the received information, the information processing module 161 in the vehicle-mounted electronic control unit 160 transfers related information such as the vehicle velocity, the steering wheel rotation angle, the hand force of the driver, and a road adhesion coefficient to the decision-making and control module 162, and the decision-making and control module 162 further determines whether to enable a function and determines braking force, driving force, and the like existing after enabling, and finally sends related control instructions such as driving torque and braking torque to corresponding actuators such as the motor 171 and the brake 173, to effectively control the vehicle.

A vehicle control method according to an embodiment of this application is described below with reference to FIG. 3.

Figure 3:
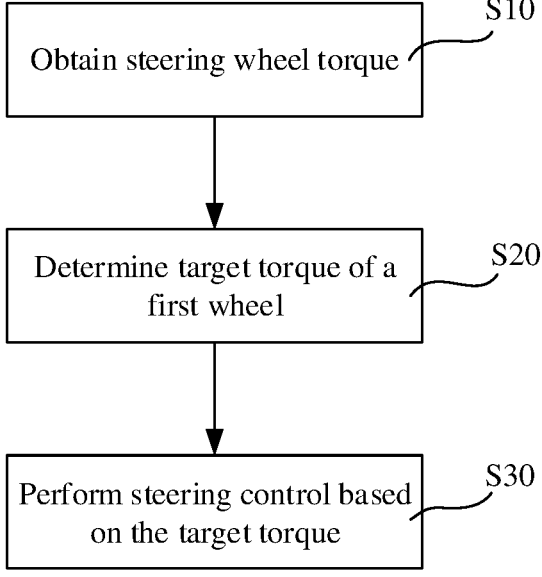
FIG. 3 is a schematic flowchart of a vehicle control method according to an embodiment of this application.

FIG. 3 is a schematic flowchart of a vehicle control method according to an embodiment of this application. The vehicle control method may be performed by a vehicle, a vehicle-mounted electronic apparatus, a vehicle-mounted computer, or the like, or may be performed by a chip or a processor of an apparatus such as a vehicle-mounted electronic apparatus or a vehicle-mounted computer. In this embodiment, an example in which the vehicle control method is performed by a vehicle domain controller is used for description.

As shown in FIG. 3, the vehicle control method includes the following content.

S10: Obtain steering wheel torque existing when a driver performs a steering operation on a steering wheel. Herein, the steering wheel torque may be obtained based on sensor data from a steering wheel torque sensor.

S20: Determine target torque of a first wheel based on the steering wheel torque of the driver. Herein, the target torque is torque in a rotation direction of the wheel. In an exemplary determining manner, for example, the target torque may be determined based on a prestored correspondence table between steering wheel torque and target torque. Alternatively, a target yaw moment may be determined based on the steering wheel torque, and then the target torque may be determined based on the target yaw moment.

S30: Perform first steering control, where the first steering control includes: controlling the first wheel based on the target torque (that is, controlling rotation of the first wheel).

According to the vehicle control method, the target torque of the first wheel is determined based on the steering wheel torque, and corresponding steering control is performed based on the target torque, so that steering with a "small steering radius" can be implemented. In addition, the target torque of the wheel is determined based on an intention of the driver, to perform steering control, so that the steering control with a "small steering radius" can well reflect the intention of the driver, to reduce a driving burden. Specifically, hand force applied when the driver performs the steering operation reflects a requirement or an expectation of the driver for a steering radius. Therefore, the target torque of the wheel is determined based on the steering wheel torque that represents the hand force of the driver, to perform steering control, so that steering control that well reflects the intention of the driver can be implemented, to avoid a case in which the driver frequently performs an operation in a steering process, for example, to correct a traveling track of a vehicle.

In addition, according to the vehicle control method, a minimum steering radius can be reduced without adding a hardware device or depending on a complex steering system, and the vehicle control method has advantages of low costs and a simple control policy.

Furthermore, the vehicle control method has good universality, and may be applied to a plurality of vehicles, including a distributed drive vehicle and a centralized drive vehicle.

The first wheel may include a first inner-side rear wheel, a first outer-side rear wheel, a first inner-side front wheel, and a first outer-side front wheel.

Optionally, the obtaining target torque of a first wheel based on the steering wheel torque includes: obtaining braking torque of a first inner-side rear wheel based on the steering wheel torque, where the first inner-side rear wheel is a rear wheel located on an inner steering side; and the controlling the first wheel based on the target torque includes: braking the first inner-side rear wheel based on the braking torque.

According to the vehicle control method, the braking torque of the rear wheel on the inner steering side is determined based on the steering wheel torque, and braking force is applied to the first inner-side rear wheel based on the braking torque during steering, to perform steering with a small steering radius. In this way, the braking torque of the wheel on the inner steering side is determined based on the intention of the driver, to perform steering control, so that the steering control with a "small steering radius" can well reflect the intention of the driver, to reduce a driving burden.

In another implementation, target driving force of a first outer-side rear wheel may be determined based on the steering wheel torque, where the first outer-side rear wheel is a rear wheel located on an outer steering side; and the first outer-side rear wheel may be driven based on the target driving force. In this case, braking force may be or may not be applied to the first inner-side rear wheel.

In addition, for example, when there is a four-wheel vehicle, there may be one first inner-side rear wheel and one first outer-side rear wheel. For example, when a quantity of wheels is greater than 4, there may be one or more wheels.

Optionally, the obtaining braking torque of a first inner-side rear wheel based on the steering wheel torque includes: obtaining a first yaw moment based on the steering wheel torque; obtaining an actual yaw rate error; obtaining a second yaw moment based on the steering wheel torque and the actual yaw rate error; and obtaining the braking torque based on the first yaw moment and the second yaw moment.

Herein, the actual yaw rate error is a difference between a target yaw rate and an actual yaw rate. The first yaw moment may be typically an additional yaw moment for feedforward control, and the second yaw moment may be typically an additional yaw moment for feedback compensation. The target yaw rate may be, for example, a vehicle body yaw rate that is estimated by the vehicle domain controller based on an angle signal from a steering wheel rotation angle sensor and with reference to a vehicle velocity signal and that should be obtained at a vehicle velocity and a steering wheel rotation angle. In addition, the target yaw rate may alternatively be estimated by a controller (electronic control unit) of an electric power steering (EPS) system.

In the manner, the second yaw moment is determined based on the steering wheel torque and the yaw rate error, and the braking torque is determined based on the first yaw moment and the second yaw moment. That is, steering control in this manner is closed-loop control, which can effectively resist external interference and improve precision of steering control.

Optionally, the obtaining a second yaw moment based on the steering wheel torque and the actual yaw rate error includes: obtaining a target yaw rate error based on the steering wheel torque; and obtaining the second yaw moment based on the target yaw rate error and the actual yaw rate error.

Optionally, the obtaining an actual yaw rate error includes: obtaining the actual yaw rate error based on a target yaw rate and an actual yaw rate.

Optionally, when the steering wheel torque is less than a first threshold, the target yaw rate error is determined as 0).

Optionally, when the steering wheel torque is greater than a first threshold, the target yaw rate error is obtained based on the steering wheel torque and a second function relationship.

Optionally, when the steering wheel torque is greater than a second threshold, the target yaw rate error is determined as a constant value.

Optionally, when the steering wheel torque is less than a first threshold, the first yaw moment is determined as 0). Alternatively, the target torque may be determined as 0).

In this way, steering control for applying braking force to the rear wheel on the inner steering side can be avoided when the hand force of the driver is very low; and steering control that better reflects the intention of the driver can be implemented.

Optionally, when the steering wheel torque is greater than a first threshold, the first yaw moment is obtained based on the steering wheel torque and a first function relationship. The first function relationship may be a linear function relationship or a non-linear function relationship. Higher steering wheel torque indicates a higher first yaw moment. Alternatively, when the steering wheel torque is greater than a first threshold, the first yaw moment may be obtained based on the steering wheel torque.

In this way, the intention of the driver can be well reflected during steering.

Optionally, when the steering wheel torque is greater than a second threshold, the first yaw moment is determined as a constant value. Alternatively, the target torque may be determined as a constant value.

In this way, traveling instability of the vehicle that is caused due to excessively high braking force can be avoided.

Optionally, the vehicle control method further includes: obtaining on/off state information of a first enabling switch; and performing the first steering control when the on/off state information indicates that the first enabling switch is turned on.

It may be understood that the first enabling switch herein is used to indicate whether the first steering control (mode) is allowed to be enabled. The first enabling switch may be a physical switch disposed on the vehicle (for example, a dashboard), or may be a virtual switch displayed in a man-machine interaction interface.

In the manner, steering control that better reflects the intention of the driver can be implemented. That is, when the first enabling switch is turned on, it indicates that the driver intends to start a steering mode of applying the braking force to the inner-side rear wheel. Therefore, when the first enabling switch is turned on, the first steering control is performed, so that the steering control can better reflect the intention of the driver.

Optionally, the vehicle control method further includes: obtaining on/off state information of a first enabling switch: obtaining a road adhesion coefficient; and performing the first steering control when the on/off state information indicates that the first enabling switch is turned off and the road adhesion coefficient is less than an adhesion coefficient threshold.

Herein, estimation of the road adhesion coefficient is estimation of a maximum adhesion rate. There is a correspondence between the adhesion rate and a tire slip ratio. The slip ratio may be estimated and calculated by using signals such as a wheel velocity, a vehicle velocity, and ground force, and then the road adhesion coefficient may be calculated with reference to longitudinal acceleration.

In the manner, even if the first enabling switch is not turned on, the first steering control is performed when the road adhesion coefficient is less than the adhesion coefficient threshold. In this way, a steering capability of the vehicle can be improved as much as possible while stability of the vehicle is ensured.

Optionally, the vehicle control method further includes: obtaining a rotation angle of the steering wheel; and performing the first steering control when the rotation angle is a limit rotation angle. Herein, the limit rotation angle is an angle at which the steering wheel is operated to the left or to the right to a limit position (which is usually a position at which the steering wheel is "killed"), namely, a maximum steering position.

In the manner, when the rotation angle of the steering wheel is the limit rotation angle (that is, the driver operates the steering wheel to the left or to the right to a limit position), steering control for braking the rear wheel on the inner steering side is performed. Therefore, a capability of a steering system to steer the wheel by operating the steering wheel can be fully used, interference to normal steering of the vehicle can be reduced, and the first steering control is avoided when no braking force needs to be applied to the inner-side rear wheel.

In addition, in another manner, the first steering control may be performed when the rotation angle of the steering wheel is not the limit rotation angle.

Optionally, the vehicle control method further includes: obtaining a slip ratio of the first inner-side rear wheel; and obtaining target driving force of a first outer-side rear wheel based on the steering wheel torque when the slip ratio is greater than a first slip ratio threshold, where the first outer-side rear wheel is a rear wheel located on an outer steering side, where the first steering control further includes: driving the first outer-side rear wheel based on the target driving force.

Optionally, the vehicle control method further includes: obtaining a slip ratio of the first inner-side rear wheel; and obtaining target driving force of a first outer-side front wheel based on the steering wheel torque when the slip ratio is greater than a first slip ratio threshold, where the first outer-side front wheel is a front wheel located on an outer steering side, where the first steering control further includes: driving the first outer-side front wheel based on the target driving force.

In the manner, a steering capability of the vehicle can be further improved by increasing the driving force of the first outer-side rear wheel or the first outer-side front wheel, to reduce occurrence of a case in which a steering requirement of the driver cannot be met after the slip ratio of the wheel reaches a maximum slip ratio. That is, for example, in consideration of stability of the vehicle and the like, the braking force of the inner-side rear wheel cannot be infinitely increased. Therefore, there is a limit to improving the steering capability of the vehicle by applying the braking force to the inner-side rear wheel. Therefore, there may be a case in which the steering requirement of the driver cannot be met. In the manner of increasing braking force of the outer-side rear wheel, the steering capability of the vehicle can be further improved, to reduce occurrence of this case.

Figure 4:
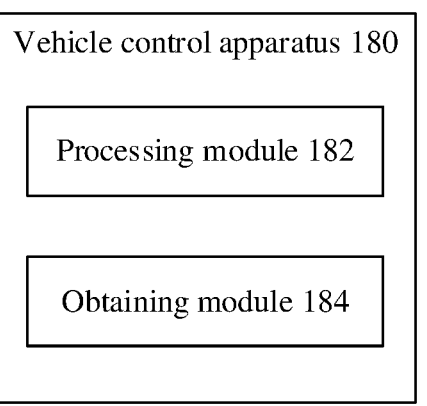
FIG. 4 is a schematic diagram of a framework structure of a vehicle control apparatus according to an embodiment of this application.

A vehicle control apparatus according to an embodiment of this application is described below:

FIG. 4 is a schematic diagram of a framework structure of a vehicle control apparatus according to an embodiment of this application. As shown in FIG. 4, the vehicle control apparatus 180 includes a processing module 182 and an obtaining module 184. The obtaining module 184 is configured to: receive and send signals, and perform corresponding processing. The signals include, for example, a sensor signal from a sensor group 150 and a control instruction signal from the processing module 182. Herein, the corresponding processing includes, for example, processing the received signal to provide a processed signal to the processing module 182. Corresponding to the vehicle control method described with reference to FIG. 3, the obtaining module 184 may be configured to perform content in S10, that is, obtain steering wheel torque of a driver, and is further configured to obtain status information of a first enabling switch, a road adhesion coefficient, a rotation angle of a steering wheel, a slip ratio, and the like.

The processing module 182 is configured to perform corresponding calculation processing based on the signals received by the obtaining module 184 and information obtained by processing the signals, and may send information such as a control instruction to the outside through the obtaining module 184. Corresponding to the vehicle control method described with reference to FIG. 3, the processing module 182 may be configured to perform content in S20 and S30 and other calculation processing described in the embodiment described with reference to FIG. 3. In addition, the road adhesion coefficient, the slip ratio, and the like may be obtained by the processing module, for example, through calculation.

A function of the vehicle control apparatus may be implemented by a processor by executing a program (software), may be implemented by using hardware such as a large scale integration (LSI) and an application-specific integrated circuit (ASIC), or may be implemented by using a combination of software and hardware. In an example, the vehicle control apparatus may be a vehicle domain controller, that is, the function of the vehicle control apparatus described above and another function are integrated into the vehicle domain controller.

In the vehicle control apparatus 180 in this embodiment, technical effects the same as those in the embodiment described with reference to FIG. 3 can be achieved. No repeated descriptions are provided herein.

Figure 5:
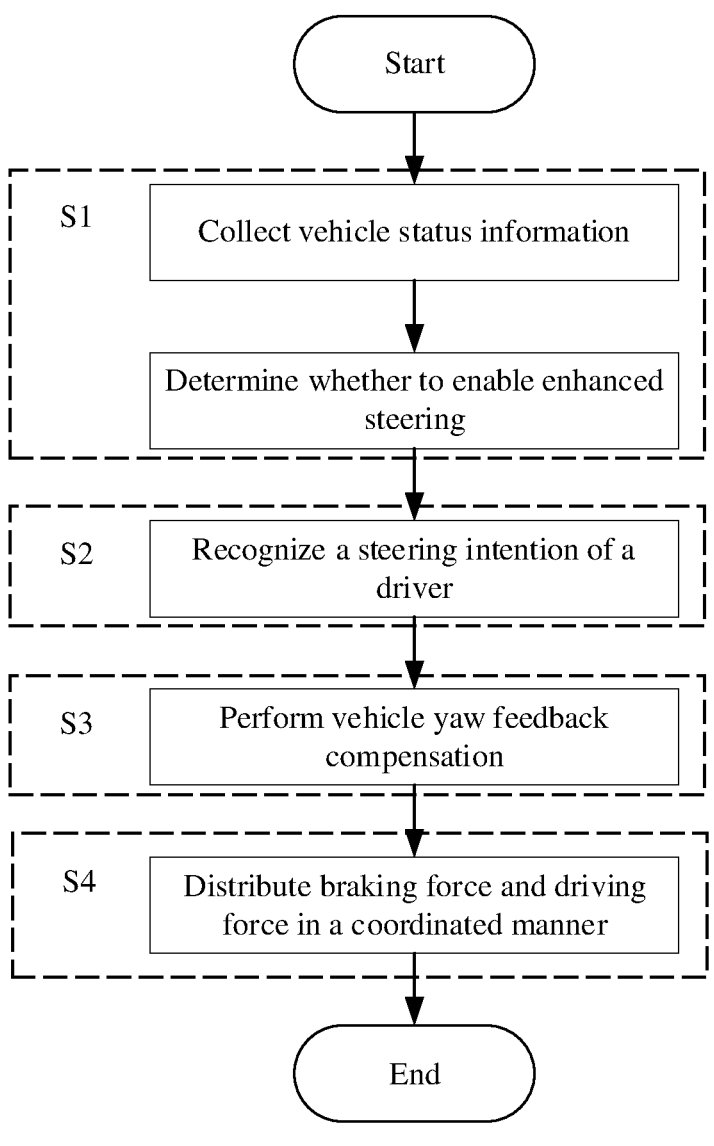
FIG. 5 is a schematic flowchart of a vehicle control method according to another embodiment of this application.

A vehicle control method according to another embodiment of this application is described below:

FIG. 5 is a schematic flowchart of a vehicle control method according to another embodiment of this application.

This embodiment provides a vehicle control method that can reduce a steering radius of a vehicle. The vehicle control method may be performed by a vehicle, a vehicle-mounted electronic apparatus, a vehicle-mounted computer, or the like, or may be performed by a chip, a processor, or the like. In the vehicle control method, whether to enable an enhanced steering function (enhanced steering mode) is determined based on an operation performed by a driver, vehicle status information, and a road adhesion status (a road adhesion coefficient). When the enhanced steering function is enabled, an intention of the driver is recognized based on hand force of the driver that is applied when a steering wheel is killed (in this case, a steering wheel rotation angle is a limit rotation angle or referred to as a maximum steering wheel rotation angle), and an additional yaw moment for feedforward control that meets a steering requirement of the driver is calculated. In addition, an additional yaw moment for feedback compensation is calculated based on the hand force of the driver, an ideal yaw rate (namely, a target yaw rate) of a vehicle, and an actual yaw rate of the vehicle, and feedback compensation is performed on a control process. Then, braking force and driving force are controlled in a coordinated manner based on a total additional yaw moment and the vehicle status information, and target braking force (target braking torque) of an inner-side rear wheel and target driving force (target driving torque) of each driving wheel are determined.

As shown in FIG. 5, the vehicle control method in this embodiment mainly includes the following content: S1: Determine whether to enable enhanced steering (mode); S2: Recognize the steering intention of the driver: S3: Perform vehicle yaw feedback compensation; and S4: Distribute the braking force and the driving force in a coordinated manner. The content is described in detail below:

S1: Determine Whether to Enable Enhanced Steering

Figure 6:
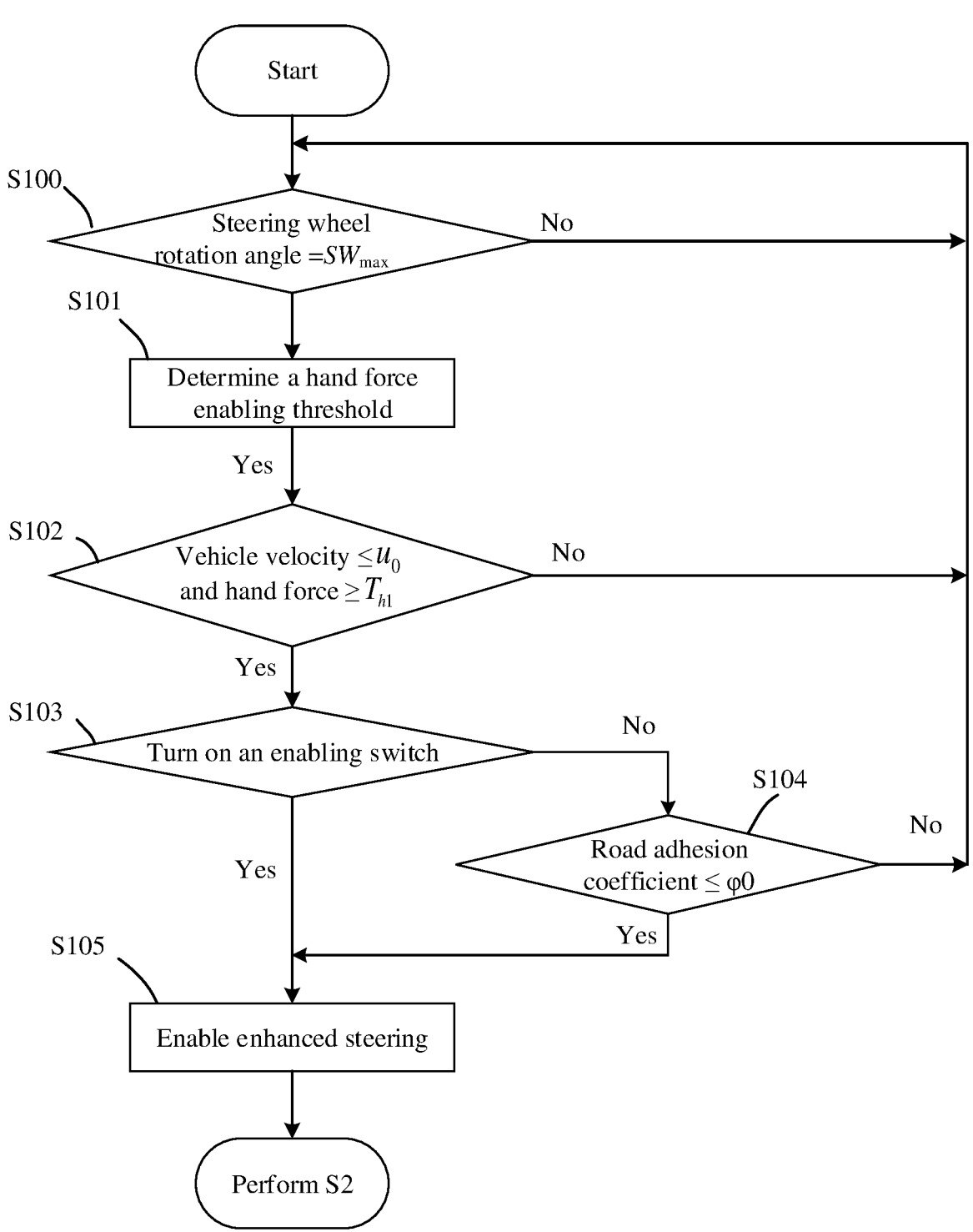
FIG. 6 is a schematic flowchart of a process of determining whether to enable enhanced steering in a vehicle control method according to an embodiment of this application.

FIG. 6 is a schematic flowchart of a process of determining whether to enable enhanced steering in a vehicle control method according to an embodiment of this application.

As shown in FIG. 6, in step S100, it is determined whether the steering wheel rotation angle reaches the maximum steering wheel rotation angle SW V max. If the steering wheel rotation angle does not reach the maximum steering wheel rotation angle, the process goes back to step S100 to continue determining. If the steering wheel rotation angle reaches the maximum steering wheel rotation angle, step S101 is performed.

In step S101, a hand force enabling threshold $T_{h1}$ is determined, and then step S102 is performed. Herein, the hand force enabling threshold $T_{h1}$ may be determined, for example, based on a vehicle velocity and/or the road adhesion coefficient. Specifically, a correspondence model (for example, a correspondence table) between the vehicle velocity or the road adhesion coefficient and the hand force enabling threshold $T_{h1}$ is established in advance, and the hand force enabling threshold $T_{h1}$ is determined based on the vehicle velocity and/or the road adhesion coefficient by using the correspondence model. In addition, different hand force enabling thresholds $T_{h1}$ may be set for different vehicles. A numerical example of the hand force enabling threshold $T_{h1}$ may be 2 N·m.

In step S102, it is determined whether the vehicle velocity is less than or equal to a and the hand force of the driver is greater than or equal vehicle velocity enabling threshold to the hand force enabling threshold $T_{h1}$ If the vehicle velocity is greater than the vehicle velocity enabling threshold and the hand force of the driver is less than the hand force enabling threshold, the process goes back to step S100 to determine, in a next period, whether to enable enhanced steering. If the vehicle velocity is less than or equal to the vehicle velocity enabling threshold and the hand force of the driver is greater than or equal to the hand force enabling threshold, step S103 is performed. Herein, the vehicle velocity enabling threshold may be, for example, set to 10 km/h. In this embodiment, such a vehicle velocity enabling threshold is set, so that the enhanced steering function is enabled when the vehicle velocity is less than or equal to the vehicle velocity enabling threshold, and the enhanced steering function is not enabled when the vehicle velocity is greater than the vehicle velocity enabling threshold. In this way, traveling stability of the vehicle can be improved.

In step S103, it is determined whether the driver turns on an enhanced steering enabling switch. If the driver turns on the enhanced steering enabling switch, step S105 is performed to enable the enhanced steering function. If the driver does not turn on the enhanced steering enabling switch, step S104 is performed. The enhanced steering enabling switch may be, for example, a physical switch disposed on a vehicle dashboard, or may be a virtual switch displayed in a man-machine interaction interface. If the driver turns on the enhanced steering switch, it indicates that the vehicle is allowed to start the enhanced steering mode. If the driver turns off the enhanced steering switch, it indicates that the vehicle is not allowed to start the enhanced steering mode.

When the enhanced steering enabling switch is not turned on, in step S104, it is determined whether the road adhesion coefficient is less than a road adhesion coefficient enabling threshold $\phi_0$. If the road adhesion coefficient is not less than the road adhesion coefficient enabling threshold, the process goes back to step S100. If the road adhesion coefficient is less than the road adhesion coefficient enabling threshold, step S105 is performed.

In step S105, a signal for enabling the enhanced steering function is sent, S2 is performed, and the process goes back to step S100 to determine, in a next period, whether to enable enhanced steering.

S2: Recognize the Steering Intention of the Driver

In a process in which the driver controls the vehicle to steer, the steering intention (the steering intention may be understood as a degree of steering expected by the driver) of the driver needs to be recognized, and control is performed based on the steering intention of the driver. In this embodiment, the steering intention of the driver is recognized based on the hand force of the driver. Higher hand force of the driver in a state of killing the steering wheel indicates a smaller steering radius and a higher additional yaw moment required by the driver. Herein, the hand force of the driver may be represented by using steering wheel torque obtained by a steering wheel torque sensor.

Figure 7:
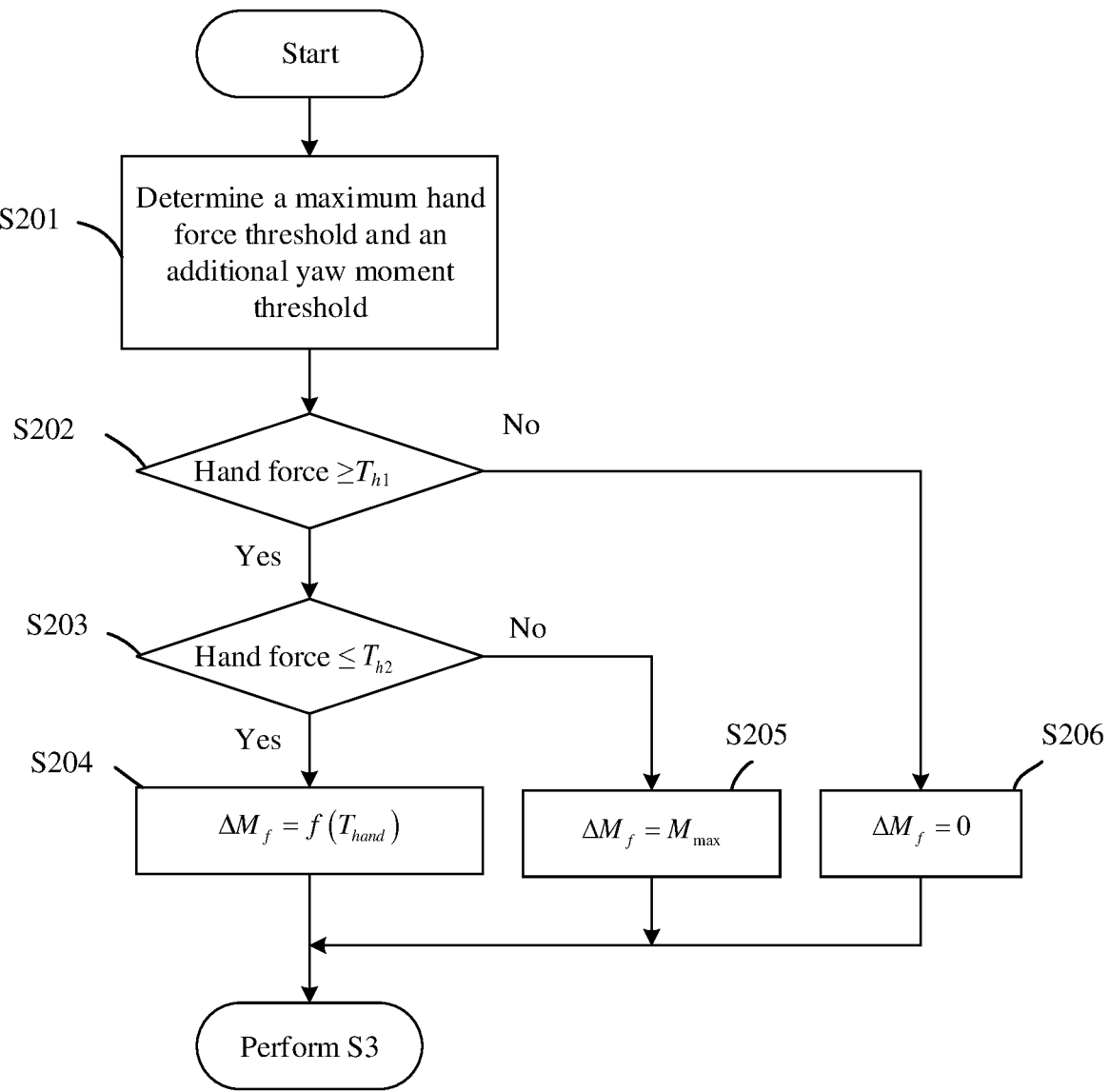
FIG. 7 is a flowchart of recognizing a steering intention of a driver and determining an additional yaw moment for feedforward control according to an embodiment of this application.

To recognize the intention of the driver, a relationship between the hand force of the driver and the additional yaw moment required by the driver may be established in advance. FIG. 7 is a flowchart of recognizing a steering intention of a driver and determining an additional yaw moment for feedforward control according to an embodiment of this application.

As shown in FIG. 7, first, maximum thresholds The and additional yaw moment thresholds $M_{max}$ corresponding to different vehicle velocities and different road adhesion coefficients are determined in step S201, and then step S202 is performed. To determine the maximum thresholds The and the additional yaw moment thresholds $M_{max}$ corresponding to different vehicle velocities and different road adhesion conditions, a corresponding correspondence model (a table, a functional expression, or the like) may be established and stored in advance. The correspondence model indicates a correspondence between the maximum threshold $T_{h2}$ and each of the vehicle velocity and the road adhesion coefficient and a correspondence between the additional yaw moment threshold and each of the vehicle velocity and the road adhesion coefficient. In addition, it may be understood that step S201 may be performed after step S202.

In step S202, it is determined whether the hand force $T_{h1}$ of the driver is greater than or equal to the hand force enabling threshold. If the hand force of the driver is greater than or equal to the hand force enabling threshold, step S203 is performed. If the hand force of the driver is less than the hand force enabling threshold, step S206 is performed to set the additional yaw moment $\Delta M_f$ for feedforward control to 0, that is, $\Delta M_f=0$, and then S3 is performed. Whether the hand force $T_h$ of the driver is greater than or equal to the hand force enabling threshold has been determined in S102. Therefore, step S202 may be considered as a redundant step.

In step S203, it is determined whether the hand force of the driver is less than or equal to a maximum threshold. Herein, the maximum threshold may range, for example, from 5 N·m to 8 N·m If a determining result in step S203 is yes, step S204 is performed, the additional yaw moment for feedforward control is determined based on a linear relationship $\Delta M_f = f(T_h)$ between the hand force of the driver and the additional yaw moment for feedforward control, and then S3 is performed. If the hand force of the driver is greater than the maximum threshold, step S205 is performed to set the additional yaw moment for feedforward control to be equal to the additional yaw moment threshold, that is, $\Delta M_f = M_{max}$, and then S3 is performed.

Figure 8:
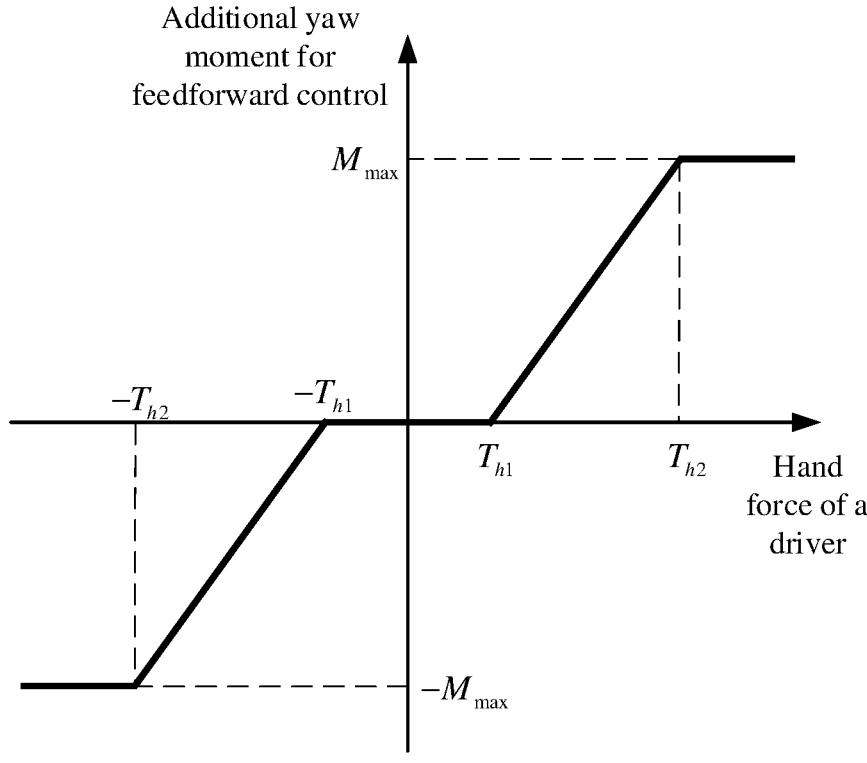
FIG. 8 is a schematic diagram of a relationship between an additional yaw moment for feedforward control and hand force of a driver according to an embodiment of this application.

In step S204, there is a positive correlation relationship between the additional yaw moment for feedforward control and the hand force of the driver, that is, the additional yaw moment for feedforward control increases with the hand force of the driver. A plurality of forms, for example, a straight line, a broken line, and a curve, may be selected for a specific curve shape of $\Delta M_f = f(T_h)$. FIG. 8 is a schematic diagram of a relationship between an additional yaw moment for feedforward control and hand force of a driver according to an embodiment of this application. As shown in FIG. 8, it may be obtained that the relationship between the additional yaw moment for feedforward control and the hand force of the driver is as follows:

$$\Delta M_f = \frac{|T_h - T_{h1}| \cdot \text{sgn}(T_h)}{T_{h2} - T_{h1}} M_{max} \qquad (1)$$

Therefore, in an entire hand force range, the relationship between the additional yaw moment for feedforward control and the hand force of the driver is shown in Table 1:

TABLE 1

Table of the relationship between the additional yaw moment for feedforward control and the hand force of the driver

| Hand force of the driver | Additional yaw moment for feedforward control |
|---|---|
| $T_h < |T_{h1}|$ | $\Delta M_f = 0$ |
| $T_{h1} \leq |T_h| \leq T_{h2}$ | $\Delta M_f = \dfrac{|T_h - T_{h1}| \cdot \text{sgn}(T_h)}{T_{h2} - T_{h1}} M_{max}$ |
| $T_h > |T_{h2}|$ | $\Delta M_f = \text{sgn}(T_h) \cdot M_{max}$ |

A piecewise function in Table 1 shows an example of a correspondence between the additional yaw moment for feedforward control and the hand force of the driver. The correspondence reflects a correspondence between braking force applied to a rear wheel on an inner steering side and the hand force of the driver. However, this application is not limited to the example shown in Table 1, and another function form may be used. For example, at an interval between $-T_{h2}$ and $T_{h2}$, there is a sinusoidal function curve, and when the hand force falls outside the interval, the additional yaw moment for feedforward control or the braking force is a constant value.

S3: Perform Vehicle Yaw Feedback Compensation

Figure 9:
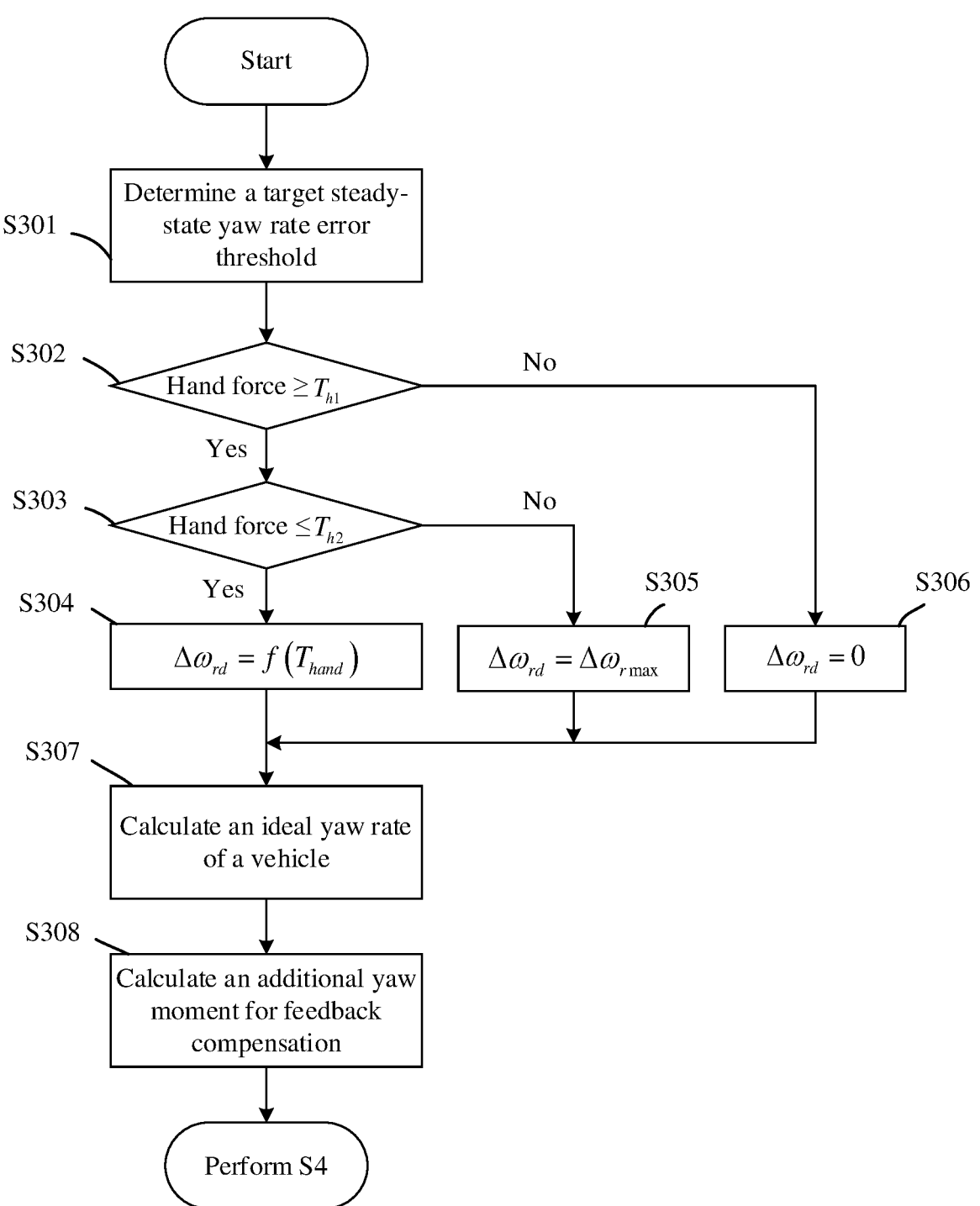
FIG. 9 is a schematic flowchart of a process of performing vehicle yaw feedback compensation according to an embodiment of this application.

The vehicle yaw feedback compensation means that feedback compensation is performed on the control process based on the hand force of the driver, the ideal yaw rate of the vehicle, and the actual yaw rate of the vehicle, to determine the additional yaw moment for feedback compensation required to meet the steering intention of the driver. FIG. 9 is a schematic flowchart of a process of performing vehicle yaw feedback compensation according to an embodiment of this application.

As shown in FIG. 9, first, in step S301, target steady-state yaw rate error thresholds $\Delta \omega_{rmax}$ corresponding to different vehicle velocities and different road adhesion coefficients when the steering wheel is killed are determined, and then step S302 is performed. Herein, a correspondence model between the target steady-state yaw rate error threshold and each of the vehicle velocity and the road adhesion coefficient may be established and stored in advance.

In step S302, it is determined whether the hand force of the driver is greater than or equal to the hand force enabling threshold. If the hand force of the driver is greater than or equal to the hand force enabling threshold, step S303 is performed. If the hand force of the driver is less than the hand force enabling threshold, step S306 is performed to set a target steady-state yaw rate error $\Delta \omega_{rd}$ to be equal to 0, that is, $\Delta \omega_{rd} = 0$, and then step S307 is performed.

In step S303, it is determined whether the hand force of the driver is less than or equal to the maximum threshold. If the hand force of the driver is less than or equal to the maximum threshold, step S304 is performed to establish a linear relationship $\Delta \omega_{rd} = f(T_h)$ between the hand force of the driver and the target steady-state yaw rate error, and then step S307 is performed. If the hand force of the driver is greater than the maximum threshold, step S305 is performed to set the target steady-state yaw rate error to be equal to the target steady-state yaw rate error threshold, that is, $\Delta \omega_{rd} = \Delta \omega_{rmax}$, and then step S307 is performed.

Figure 10:
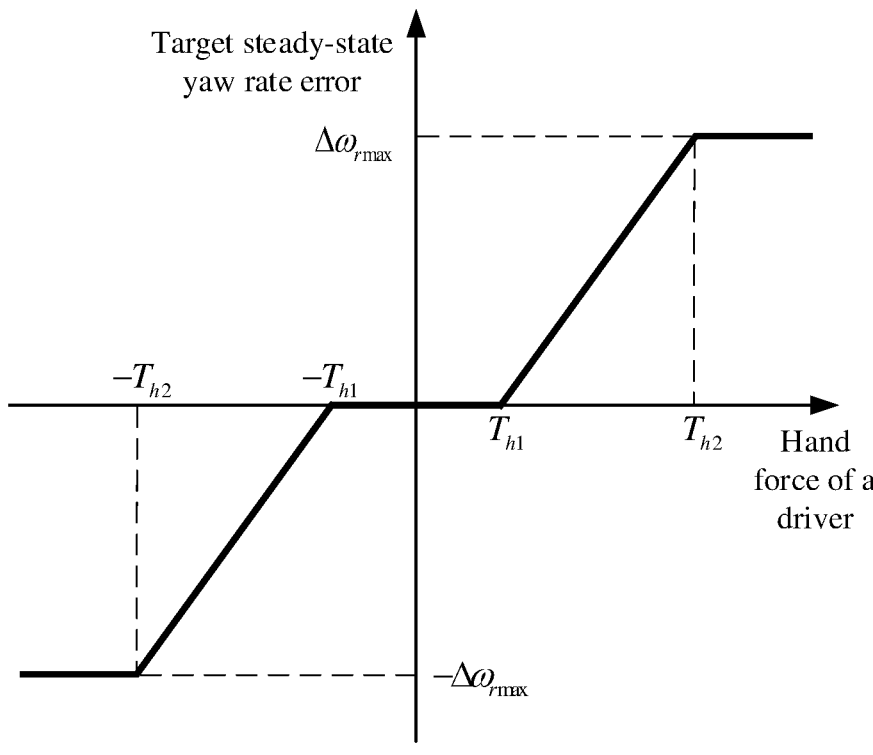
FIG. 10 is a schematic illustration of a correlation relationship between a target steady-state yaw rate error and hand force of a driver according to an embodiment of this application.

In step S304, there is a positive correlation relationship between the target steady-state yaw rate error and the hand force of the driver, that is, the target steady-state yaw rate error increases with the hand force of the driver. A plurality of forms, for example, a straight line, a broken line, and a curve, may be selected for a specific curve shape of $\Delta \omega_{rd} = f(T_h)$ Herein, a straight line form is used as an example for description. FIG. 10 is a schematic illustration of a correlation relationship between a target steady-state yaw rate error and hand force of a driver according to an embodiment of this application. As shown in FIG. 10, it may be obtained that the relationship between the target steady-state yaw rate error and the hand force of the driver is as follows:

$$\Delta \omega_{rd} = \frac{|T_h - T_{h1}| \cdot \text{sgn}(T_h)}{T_{h2} - T_{h1}} \Delta \omega_{max} \qquad (2)$$

Therefore, in the entire hand force range, the relationship between the target steady-state yaw rate error and the hand force of the driver is shown in Table 2:

TABLE 2

Table of the relationship between the target yaw rate error and the hand force of the driver

| Hand force of the driver | Target yaw rate error |
|---|---|
| $T_h < |T_{h1}|$ | $\Delta \omega_{rd} = 0$ |
| $T_{h1} \leq |T_h| \leq T_{h2}$ | $\Delta \omega_{rd} = \dfrac{|T_h - T_{h1}| \cdot \text{sgn}(T_h)}{T_{h2} - T_{h1}} \Delta \omega_{r\,max}$ |
| $T_h > |T_{h2}|$ | $\Delta \omega_{rd} = \Delta \omega_{rmax}$ |

In step S307, the ideal yaw rate of the vehicle is calculated, for example, by using an ideal two-degree-of-freedom vehicle model. The ideal yaw rate $\omega_{rd}$ of the vehicle may be expressed as follows:

$$\omega_{rd} = \frac{u/L}{1 + Ku^2} \tag{3}$$

Herein, u is a longitudinal vehicle velocity of the vehicle, L is a wheel base of the vehicle, and K is a stability factor. The stability factor may be expressed as follows:

$$K = \frac{m}{L^2}\left(\frac{a}{k_2} - \frac{b}{k_1}\right) \tag{4}$$

Herein, m is mass of the entire vehicle, a and b are respectively distances between front and rear axles to a center of mass of the vehicle, and $k_1$ and $k_2$ are respectively comering stiffness of front and rear wheels. After the ideal yaw rate of the vehicle is calculated, step S308 is performed.

In step S308, the additional yaw moment for feedback compensation is calculated. The actual yaw rate $w_r$ of the vehicle is first obtained by using a yaw rate sensor, and then it is obtained that an actual yaw rate error of the vehicle is $\Delta\omega_r = \omega_r - \omega_{rd}$. Proportion integration (PI) control is performed on a difference between the target steady-state yaw rate error and the actual yaw rate error, to obtain the additional yaw moment $\Delta M_b$ for feedback compensation. The additional yaw moment for feedback compensation may be expressed as follows:

$$\Delta M_b = K_P(\Delta\omega_{rd} - \Delta\omega_r) + K_I \int_0^t (\Delta\omega_{rd} - \Delta\omega_r)dt \tag{5}$$

Herein, $K_P$ and $K_I$ are respectively a proportion coefficient and an integration coefficient. After the additional yaw moment for feedback compensation is calculated, S4 is performed.

S4: Distribute the Braking Force and the Driving Force in the Coordinated Manner The additional yaw moment for feedforward control and the additional yaw moment for feedback compensation are respectively obtained by performing S2 and S3. In this case, the total additional yaw moment of the vehicle may be expressed as follows:

$$\Delta M = \Delta M_f + \Delta M_b =$$
$$\frac{|T_h - T_{h1}| \cdot \text{sgn}(T_h)}{T_{h2} - T_{h1}} M_{max} + K_P(\Delta\omega_{rd} - \Delta\omega_r) + K_I \int_0^t (\Delta\omega_{rd} - \Delta\omega_r)dt \tag{6}$$

After the total additional yaw moment is obtained, the braking force and the driving force are distributed in the coordinated manner. For different vehicle models, the braking force and the driving force are distributed in different manners. Descriptions are respectively provided for different vehicle models.

Four-wheel independent drive vehicle:

For the four-wheel independent drive vehicle, an inner-side rear wheel is first braked. In this case, two front wheels are controlled to drive, and driving force of two rear wheels is 0. When the inner-side rear wheel is braked, a slip ratio of the inner-side rear wheel may be monitored. When the slip ratio of the wheel reaches an optimal slip ratio (which approximately ranges from 15% to 20%), braking force is no longer increased, to prevent the wheel from being locked. In this case, braking torque of the inner-side rear wheel and driving torque of the four wheels are respectively as follows:

$$\begin{cases} T_b = \min\left(\frac{2 \cdot \Delta M \cdot r}{B}, \phi F_{zb}r\right) \\ T_1 = T_2 = \dfrac{T_b + (F_{y1} \sin \delta_1 + F_{y2} \sin \delta_2 - mv\omega_r)r}{\cos \delta_1 + \cos \delta_2} \\ T_3 = T_4 = 0 \end{cases} \tag{7}$$

In the formula, $T_b$ is the braking torque of the inner-side rear wheel, $\phi$ is the road adhesion coefficient, $F_{zb}$ is vertical force of the inner-side rear wheel, $T_1$, $T_2$, $T_3$, and $T_4$ are respectively the driving torque of an inner-side front wheel, an outer-side front wheel, the inner-side rear wheel, and an outer-side rear wheel, $F_{y1}$ and $F_{x2}$ are respectively lateral force of the inner-side front wheel and the outer-side front wheel, $\delta_1$ and $\delta_2$ are respectively rotation angles of the inner-side front wheel and the outer-side front wheel, B is a wheel track of the vehicle, r is a wheel radius, and V is a lateral vehicle velocity of the vehicle.

After the slip ratio of the wheel reaches a maximum slip ratio (an upper limit of the optimal slip ratio), if the hand force of the driver continues to increase, it is considered that a steering requirement of the driver cannot be met in this case, and the driving force of the outer-side rear wheel may be increased. In this case, the braking torque of the inner-side rear wheel and the driving torque of the four wheels are respectively as follows:

$$\begin{cases} T_b = \phi F_{zb}r \\ T_1 = T_2 = \dfrac{T_b - T_4 + (F_{y1} \sin \delta_1 + F_{y2} \sin \delta_2 - mv\omega_r)r}{\cos \delta_1 + \cos \delta_2} \\ T_3 = 0 \\ T_4 = \dfrac{2 \cdot \Delta M \cdot r}{B} - \phi F_{zb}r \end{cases} \tag{8}$$

In this way, based on a change of the hand force of the driver existing after the steering wheel is killed, when the hand force of the driver increases, the driving force of the outer-side rear wheel is increased based on the hand force of the driver (including a change from a state in which the driving force is 0 to a state in which the driving force starts to be applied), so that the steering requirement of the driver can be met as much as possible.

Front-Wheel Centralized Drive Vehicle:

For the front-wheel centralized drive vehicle, only an inner-side rear wheel needs to be braked, and two front wheels are controlled to drive. When the inner-side rear wheel is braked, a slip ratio of the inner-side rear wheel may be monitored. When the slip ratio of the wheel reaches an optimal slip ratio (which approximately ranges from 15% to 20%), braking force is no longer increased, to prevent the wheel from being locked. In this case, braking torque of the inner-side rear wheel and driving torque of the two front wheels are respectively as follows:

$$\begin{cases} T_b = \min\left(\dfrac{2 \cdot \Delta M \cdot r}{B},\ \phi F_{zb} r\right) \\ T_1 = T_2 = \dfrac{T_b + (F_{y1}\ \sin\ \delta_1 + F_{y2}\ \sin\ \delta_2 - mv\omega_r)r}{\cos\ \delta_1 + \cos\ \delta_2} \end{cases} \qquad (9)$$

Rear-Wheel Centralized Drive Vehicle:

For the rear-wheel centralized drive vehicle, an inner-side rear wheel needs to be braked, and two rear wheels are controlled to drive. When the inner-side rear wheel is braked, a slip ratio of the inner-side rear wheel may be monitored. When the slip ratio of the wheel reaches an optimal slip ratio (which approximately ranges from 15% to 20%), braking force is no longer increased, to prevent the wheel from being locked. In this case, braking torque of the inner-side rear wheel and driving torque of the two rear wheels are respectively as follows:

$$\begin{cases} T_b = \min\left(\dfrac{2 \cdot \Delta M \cdot r}{B},\ \phi F_{zb} r\right) \\ T_3 = T_4 = \dfrac{T_b + (F_{y1}\ \sin\ \delta_1 + F_{y2}\ \sin\ \delta_2 - mv\omega_r)r}{2} \end{cases} \qquad (10)$$

In this embodiment, the steering intention of the driver is recognized by using the hand force of the driver, and the correspondence (a linear relationship in this embodiment) between the hand force of the driver that is applied when the steering wheel is killed and the additional yaw moment is established, so that feedforward control is performed on the vehicle based on the steering intention of the driver, to implement steering control that well reflects the intention of the driver, and reduce a driving operation burden.

In this embodiment, when it is determined whether to enable the enhanced steering function, to consider different road surface environments and the steering intention of the driver and reduce tire wear, two different enabling manners are set for a high-adhesion road surface and a low-adhesion road surface. When there is a small road adhesion coefficient, the enhanced steering function can be enabled provided that the hand force of the driver, the vehicle velocity, and the steering wheel rotation angle meet an enabling condition, and the driver does not need to manually trigger the enhanced steering enabling switch. When there is a large road adhesion coefficient, if all of the hand force of the driver, the vehicle velocity, and the steering wheel rotation angle meet the enabling condition, but the driver does not trigger the enhanced steering enabling switch, the enhanced steering function is not enabled. In this way, the tire wear can be reduced. However, if the driver triggers the enhanced steering enabling switch, the enhanced steering function is still enabled, to meet the steering requirement of the driver. In another embodiment, the enhanced steering enabling switch may not be disposed.

In this embodiment, the enhanced steering function is enabled only when the steering wheel is killed. Therefore, a steering capability of a steering system can be fully used, and a normal steering process is not interfered with. In another embodiment, the enhanced steering function may be enabled without killing the steering wheel.

In this embodiment, feedback compensation is performed based on the hand force of the driver, the ideal yaw rate of the vehicle, and the actual yaw rate of the vehicle, so that a closed control loop can be formed to improve an anti-interference capability and a control effect of a system. In another embodiment, feedback compensation may not need to be performed.

In this embodiment, in the control process, the slip ratio of the wheel is monitored to prevent the wheel from being locked, ensure that maximum braking force can be provided, and reduce the tire wear. In addition, when the braking force reaches the maximum braking force, the driving force of the outer-side rear wheel may be further increased to reduce a minimum steering radius of the vehicle. In another embodiment, the control may not need to be implemented.

In this embodiment, without adding a hardware basis, depending on a complex steering system, and increasing costs, the minimum steering radius of the vehicle is reduced by controlling braking and driving in a coordinated manner. In addition, the method is applicable to both a distributed drive vehicle and a centralized drive vehicle.

Figure 11:
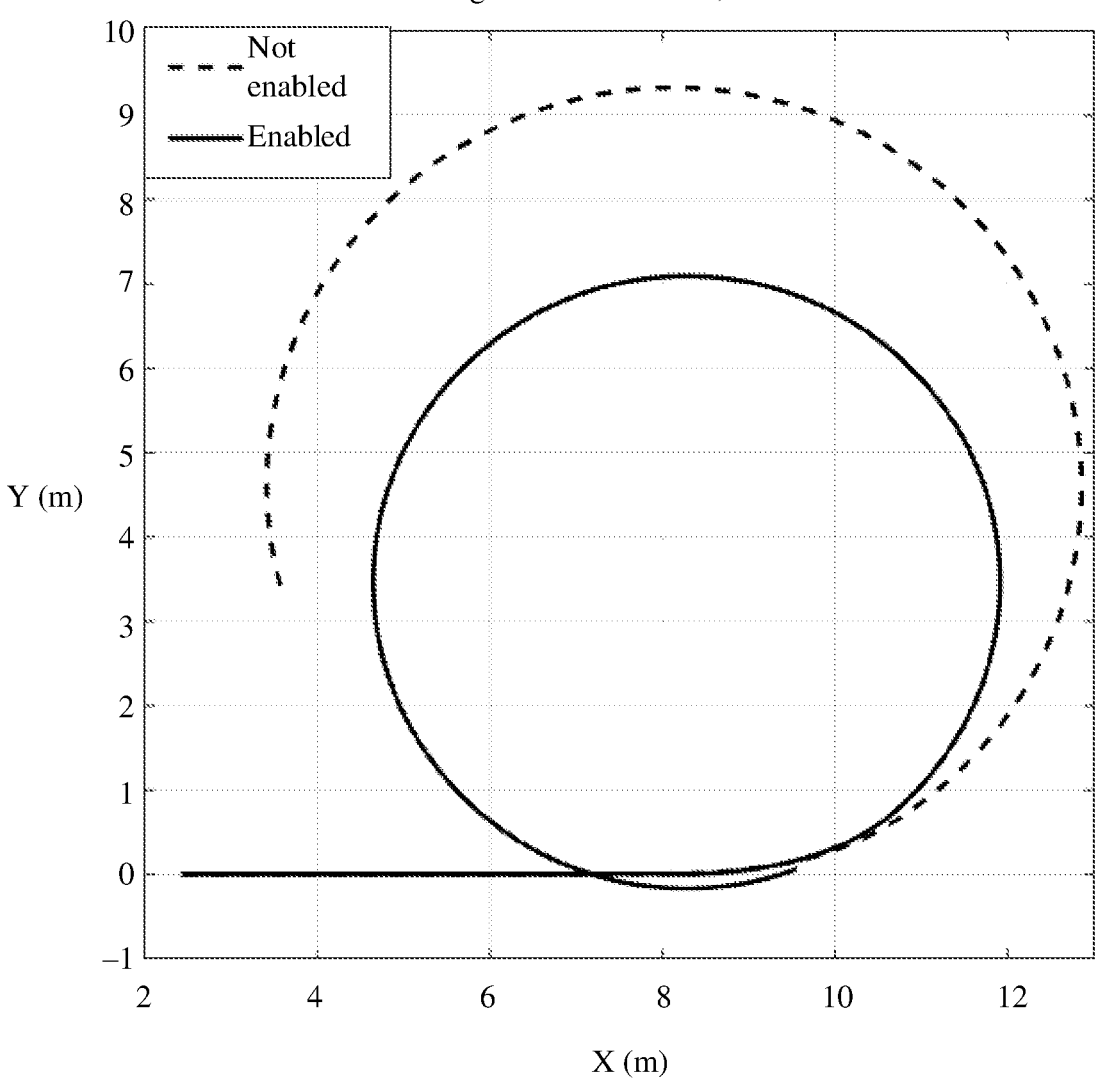
FIG. 11 is a comparison diagram of traveling track effects of a vehicle that are achieved when a steering control solution provided in an embodiment of this application is used and when the steering control solution is not used.

FIG. 11 is a comparison diagram of traveling track effects of a vehicle that are achieved when the steering control solution provided in this embodiment is used and when the steering control solution is not used. It may be learned that the vehicle control method for reducing a steering radius of a vehicle provided in this embodiment can significantly reduce the minimum steering radius of the vehicle.

Cases in which the solution of this application is applicable to the four-wheel independent drive vehicle, the front-wheel centralized drive vehicle, and the rear-wheel centralized drive vehicle are described above. However, this application is not limited thereto, and is further applicable to another type of vehicle, for example, a vehicle whose rear wheels are independently driven by two motors, namely, a vehicle whose left and right rear wheels each are driven by one motor.

In addition, the solution of this application is not only applicable to a vehicle with four wheels, but also applicable to another type of vehicle, for example, a vehicle with six wheels or 10 wheels. In this case, the vehicle has a plurality of inner-side rear wheels. In the enhanced steering mode, braking force may be applied to the plurality of inner-side rear wheels or to only some inner-side rear wheels. The "rear wheel" herein is a wheel located behind a frontmost wheel. When the vehicle has more than four wheels, the rear wheel may include a wheel located in the middle of the vehicle and/or a rearmost wheel.

Figure 12:
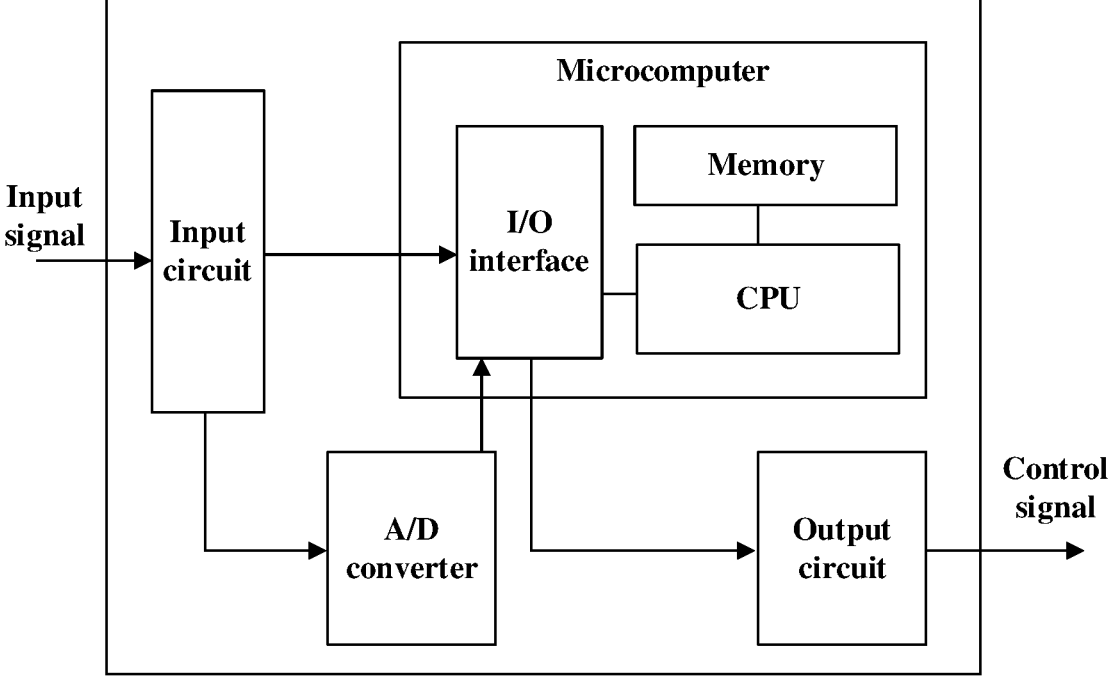
FIG. 12 is a schematic diagram of a structure of an electronic control unit according to an embodiment of this application.

FIG. 12 is a schematic diagram of a structure of an electronic control unit according to an embodiment of this application.

The electronic control unit is a control apparatus that includes an integrated circuit and that is configured to implement a series of functions such as data analysis, processing, and sending. As shown in FIG. 12, the ECU includes a microcomputer, an input circuit, an output circuit, and an analog-to-digital (A/D) converter.

A main function of the input circuit is to preprocess an input signal (for example, a signal from a sensor), and a processing method varies with the input signal. Specifically, there are two types of input signals: an analog signal and a digital signal. Therefore, the input circuit may include an input circuit for processing the analog signal and an input circuit for processing the digital signal.

A main function of the A/D converter is to convert an analog signal into a digital signal. After being preprocessed by the corresponding input circuit, the analog signal is input to the A/D converter for processing and conversion into a digital signal to be received by the microcomputer.

The output circuit is an apparatus for establishing a connection between the microcomputer and an actuator. A function of the output circuit is to convert a processing result sent by the microcomputer into a control signal to drive the actuator to work. The output circuit is usually a power transistor, and controls an electronic loop of an execution element through conduction or cutoff based on instructions from the microcomputer.

The microcomputer includes a central processing unit (CPU), a memory, and an input/output (I/O) interface. The CPU is connected to the memory and the I/O interface by using a bus, and may exchange information with each other by using the bus. The memory may be a memory such as a read-only memory (ROM) or a random access memory (RAM). The I/O interface is a connection circuit for exchanging information between the central processing unit (CPU) and the input circuit, the output circuit, or the A/D converter. Specifically, the I/O interface may be classified into a bus interface and a communication interface. The memory stores a program, and the CPU invokes the program in the memory to perform the vehicle control method described in the embodiment corresponding to FIG. 3 or FIG. 5.

In addition, it may be learned from the foregoing descriptions that an embodiment of this application further provides a computer program product, a computer-readable storage medium (memory) that stores the computer program (instructions), and an electronic apparatus including the memory and a processor. When the computer program is run by a computer or the processor, the computer or the processor is enabled to perform the vehicle control method described in the embodiment corresponding to FIG. 3 or FIG. 5.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A vehicle control method, comprising:
   obtaining steering wheel torque existing based on a driver performing a steering operation on a steering wheel;
   obtaining target torque of a first wheel based on the steering wheel torque; and
   performing first steering control, wherein the first steering control comprises controlling the first wheel based on the target torque;
   wherein the obtaining the target torque of the first wheel based on the steering wheel torque comprises obtaining braking torque of a first inner-side rear wheel based on the steering wheel torque, wherein the first inner-side rear wheel is a rear wheel located on an inner steering side;
   wherein the controlling the first wheel based on the target torque comprises braking the first inner-side rear wheel based on the braking torque; and
   wherein the obtaining the braking torque of the first inner-side rear wheel based on the steering wheel torque comprises:
      obtaining a first yaw moment based on the steering wheel torque;
      obtaining an actual yaw rate error;
      obtaining a second yaw moment based on the steering wheel torque and the actual yaw rate error; and
      obtaining the braking torque based on the first yaw moment and the second yaw moment.

2. The method according to claim 1, wherein the obtaining the second yaw moment based on the steering wheel torque and the actual yaw rate error comprises:
   obtaining a target yaw rate error based on the steering wheel torque; and obtaining the second yaw moment based on the target yaw rate error and the actual yaw rate error.

3. The method according to claim 1, wherein the obtaining the actual yaw rate error comprises:
   obtaining the actual yaw rate error based on a target yaw rate and an actual yaw rate.

4. The method according to claim 1, wherein the obtaining the first yaw moment based on the steering wheel torque comprises:
   determining the first yaw moment as 0 based on the steering wheel torque being less than a first threshold.

5. The method according to claim 1, wherein the obtaining the first yaw moment based on the steering wheel torque comprises:
   obtaining the first yaw moment based on the steering wheel torque and a first function relationship based on the steering wheel torque being greater than a first threshold.

6. The method according to claim 1, wherein the obtaining the first yaw moment based on the steering wheel torque comprises:
   determining the first yaw moment as a constant value based on the steering wheel torque being greater than a second threshold.

7. The method according to claim 1, further comprising:
   obtaining on/off state information of a first enabling switch; and
   performing the first steering control based on the on/off state information indicating that the first enabling switch is turned on.

8. The method according to claim 1, further comprising:
   obtaining on/off state information of a first enabling switch:
   obtaining a road adhesion coefficient; and
   performing the first steering control based on the on/off state information indicating that the first enabling switch is turned off and the road adhesion coefficient is less than an adhesion coefficient threshold.

9. The method according to claim 1, further comprising:
   obtaining a rotation angle of the steering wheel; and
   performing the first steering control based on the rotation angle being a limit rotation angle.

10. The method according to claim 1, further comprising:
    obtaining a slip ratio of the first inner-side rear wheel; and
    obtaining target driving force of a first outer-side rear wheel based on the steering wheel torque based on the slip ratio being greater than a first slip ratio threshold, wherein the first outer-side rear wheel is a rear wheel located on an outer steering side, wherein
    the first steering control further comprises: driving the first outer-side rear wheel based on the target driving force.

11. The method according to claim 1, further comprising:
    obtaining a slip ratio of the first inner-side rear wheel; and
    obtaining target driving force of a first outer-side front wheel based on the steering wheel torque based on the slip ratio being greater than a first slip ratio threshold, wherein the first outer-side front wheel is a front wheel located on an outer steering side, wherein
    the first steering control further comprises: driving the first outer-side front wheel based on the target driving force.

12. A vehicle control apparatus, comprising:
    a receiver configured to obtain steering wheel torque existing based on a driver performing a steering operation on a steering wheel; and

a processor is configured to:

determine target torque of a first wheel based on the steering wheel torque; and perform first steering control, wherein the first steering control comprises controlling the first wheel based on the target torque wherein the obtaining the target torque of the first wheel based on the steering wheel torque comprises obtaining braking torque of a first inner-side rear wheel based on the steering wheel torque, wherein the first inner-side rear wheel is a rear wheel located on an inner steering side;

wherein the controlling the first wheel based on the target torque comprises braking the first inner-side rear wheel based on the braking torque; and wherein the obtaining the braking torque of the first inner-side rear wheel based on the steering wheel torque comprises:

obtaining a first yaw moment based on the steering wheel torque;

obtaining an actual yaw rate error;

obtaining a second yaw moment based on the steering wheel torque and the actual yaw rate error; and obtaining the braking torque based on the first yaw moment and the second yaw moment.

13. The apparatus according to claim 12, wherein the processor is configured to:

obtain a target yaw rate error based on the steering wheel torque; and obtain the second yaw moment based on the target yaw rate error and the actual yaw rate error.

14. The apparatus according to claim 12, wherein the processor is configured to obtain the actual yaw rate error based on a target yaw rate and an actual yaw rate.

15. The apparatus according to claim 12, wherein the processor is configured to determine the first yaw moment as 0 based on the steering wheel torque being less than a first threshold.

16. A non-transitory computer-readable storage medium, wherein the computer-readable storage medium stores computer program instructions, and when the computer program instructions are executed by a computer, the computer is caused to perform a method comprising:

obtaining steering wheel torque existing based on a driver performing a steering operation on a steering wheel;

obtaining target torque of a first wheel based on the steering wheel torque; and performing first steering control, wherein the first steering control comprises controlling the first wheel based on the target torque;

wherein the obtaining the target torque of the first wheel based on the steering wheel torque comprises obtaining braking torque of a first inner-side rear wheel based on the steering wheel torque, wherein the first inner-side rear wheel is a rear wheel located on an inner steering side;

wherein the controlling the first wheel based on the target torque comprises braking the first inner-side rear wheel based on the braking torque; and wherein the obtaining the braking torque of the first inner-side rear wheel based on the steering wheel torque comprises:

obtaining a first yaw moment based on the steering wheel torque;

obtaining an actual yaw rate error;

obtaining a second yaw moment based on the steering wheel torque and the actual yaw rate error; and obtaining the braking torque based on the first yaw moment and the second yaw moment.

17. The computer-readable storage medium according to claim 16, wherein the obtaining the second yaw moment based on the steering wheel torque and the actual yaw rate error comprises:

obtaining a target yaw rate error based on the steering wheel torque; and obtaining the second yaw moment based on the target yaw rate error and the actual yaw rate error.

18. The computer-readable storage medium according to claim 16, wherein the obtaining the actual yaw rate error comprises:

obtaining the actual yaw rate error based on a target yaw rate and an actual yaw rate.

19. The computer-readable storage medium according to claim 16, wherein the obtaining the first yaw moment based on the steering wheel torque comprises:

determining the first yaw moment as 0 based on the steering wheel torque being less than a first threshold.

20. The computer-readable storage medium according to claim 16, wherein the obtaining the first yaw moment based on the steering wheel torque comprises:

obtaining the first yaw moment based on the steering wheel torque and a first function relationship based on the steering wheel torque being greater than a first threshold.

* * * * *